Oct. 5, 1965   W. A. FLUMERFELT   3,210,107
DUST GUARDS
Filed July 9, 1962
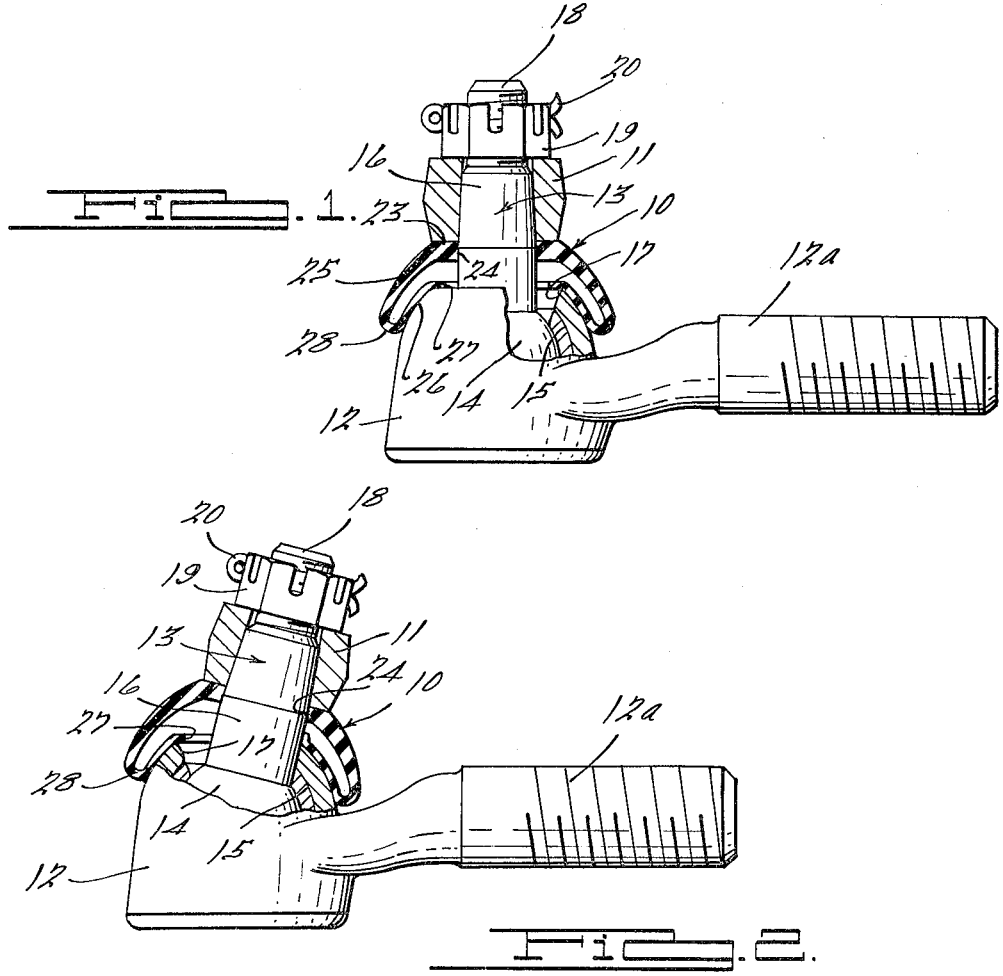
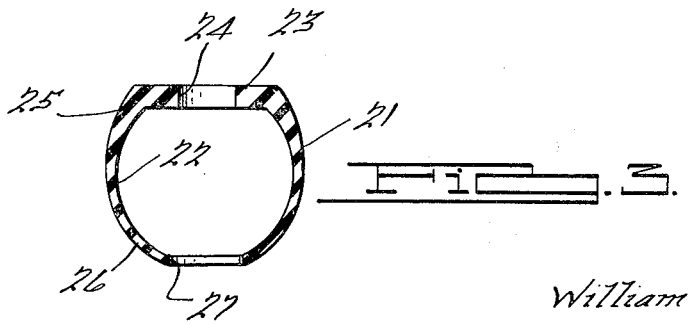
INVENTOR.
William A. Flumerfelt
BY
Harness, Dickey & Pierce
ATTORNEYS.

United States Patent Office 3,210,107
Patented Oct. 5, 1965

3,210,107
DUST GUARDS
William A. Flumerfelt, Columbus, Ohio, assignor to The Columbus Auto Parts Company, Columbus, Ohio, a corporation of Ohio
Filed July 9, 1962, Ser. No. 208,422
3 Claims. (Cl. 287—90)

This invention relates to dust guards for universal joints and particularly to a dust guard for an automotive steering linkage joint of the type incorporating a stud projecting from a housing and having a head supported within the housing.

It is an object of the present invention to provide a dust guard for universal joints or the like, which is operable to close the openings between the relatively movable parts of the joint to prevent the entrance of dust, water or other contaminating matter into the interior of the joint where the bearing surfaces of the joint are located.

It is another object of the present invention to provide a dust guard of the above character which undergoes little or no rubbing contact with the surfaces of the joint which it seals and thereby possesses substantial freedom from wear.

It is still another object of the present invention to provide a dust guard which is usable on a wide variety of stud-incorporating universal joints without special machining of the parts of the joint to accommodate the dust guard, and the use of separate metal clamps or the like to secure the dust guard in place.

It is still another object of the present invention to provide a dust guard for universal joints that is made from an elastomeric material to accommodate universal movement of the stud wherein the resiliency of the material is utilized to maintain the dust guard in tight-fitting engagement with the several parts of the joint.

It is a further object of the present invention to provide a dust guard for universal joints which is not readily displaced from its intended position during use.

Other objects and advantages of the present invention include the provision of a dust guard which may be fabricated at a relatively low cost, which is of rugged, durable construction and which is operable to protect the universal joint through a long, useful life.

These and other objects of the present invention will become apparent from the following detailed description, taken in conjunction with the accompanying drawings, wherein:

FIGURE 1 is an elevational view partly in section of a dust guard embodying the features of the present invention as applied to a ball joint steering arm construction;

FIG. 2 is a view of the structure illustrated in FIG. 1 with the ball stud being rotated to another position; and FIG. 3 is a vertical sectional view of the dust guard of the present invention, the dust guard being shown in its normal condition and prior to assembly in the joint.

Referring now to the drawings, the dust guard, generally indicated by the numeral 10, is illustrated as applied to a joint in the form of a steering arm assembly. The joint includes a steering arm 11, a housing or forged socket member 12 and a ball stud 13 having a segmentally spherical head 14 disposed within a cavity or socket 15 of the housing 12. A stud portion 16 of the ball stud 13 projects through an opening 17 in the upper end of the housing 12 and is provided with a threaded extremity 18 onto which a nut 19 is threaded and secured in place by a cotter pin 20.

The dust guard 10 is primarily of hollow spherical shape and includes a concavo-convex wall 21 having a hollow interior surface 22. A radially inwardly extending annular flange 23 extends inwardly from one end of the wall 21 and is formed with a circular opening 24.

The wall 21 may be regarded as including a thin-walled upper portion 25 which merges into a thin-walled lower portion 26. The lower portion 26 is formed with an opening 27 disposed in alignment with the opening 24, but of greater diameter than the opening 24.

When assembled in the joint, the dust guard 10 is adapted to be distorted from its normal shape to define a U-shaped reversely bent portion 28 between the wall portions 25 and 26. The distance between the upper end of the housing 12 and the lower side of the arm 11 is substantially less than the height of the dust guard between the openings 24 and 27. For this reason, the dust guard is compressed axially of the stud portion 16 as it is installed between the arm 11 and housing 12, while the stud portion 16 projects through the openings 27 and 24. The diameter of the opening 24 is such that the material of the dust guard at the opening 24 tightly engages the surface of the stud portion 16, while the material defining the opening 27 spacedly surrounds the stud portion 16. Additionally, the outer surface of the dust guard lower portion 26 conformably engages the upper portion of the housing 12 surrounding the opening 17. It will thus be seen that the outer surface of the dust guard wall portion 26, which is normally convex, is deformed to a concave or nearly flat shape. The upper dust guard wall portion 25, being of greater thickness than the wall portion 26, maintains its shape and assures that the deformation of the dust guard will be in the lower portion 26, rather than in the upper portion 25.

It has been found that in the use of a similarly designed dust guard but in which a wall of uniform thickness was used, the upper wall portion of the dust guard adjacent the steering arm would deform, rather than the portion of the dust guard adjacent the housing. However, the relative proportioning of the wall portions 25 and 26 assures that the dust guard will deform to maintain the wall portion 26 in sealing engagement with the housing 12. During use, the wall portion 26 attempts to return to its normal shape and, in so doing, is biased tightly against the outer surface of the housing 12 providing a sealed joint therewith and preventing the entrance of dirt, water or other contaminating matter through the opening 17 to the interior of the housing 12. As the stud 16 is initially pivoted from the upright position shown in FIG. 1, it carries the dust guard flange 23 with it. As indicated in FIG. 2, the portion of the wall 21 on the side opposite from the direction of movement will roll up the outer surface of the housing 12, while the portion of the wall 21 on the side toward which the stud 16 is pivoted will roll down the wall until the stud 16 engages one edge of the material defining the opening 27. This material will stretch to a certain extent, permitting further pivotal or angular movement of the stud 16 without causing sliding movement of the dust guard wall portion 26 over the outer surface of the housing 12. This is advantageous in minimizing wear on the dust guard in the area of the wall portion 26 and in maintaining a tight seal between the dust guard and the housing 12.

This is a continuation-in-part of my copending application Serial No. 834,810, filed August 19, 1959 and now abandoned.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A dust guard adapted for use with a universal joint of the type having a housing and a stud projecting from said housing, said dust guard comprising a unitarily formed piece of material of generally hollow spheroidal shape having a wall portion of outwardly convex and inwardly concave shape, said wall being of substantially lesser thickness at one end thereof than at its other end and said wall having an opening at its thin end and a radially inwardly extending annular flange at the thick end of said wall defining an opening disposed in alignment with the opening at the thin end of said wall for the reception of a stud extending through said openings each of said openings being smaller than the inside diameter of said wall.

2. A dust guard adapted for use with a universal joint of the type having a housing and a stud projecting from said housing, said dust guard comprising a unitarily formed piece of material of generally hollow spheroidal shape having openings at its opposite ends for the reception of said stud and provided with an outwardly convex and inwardly concave wall between said openings, each of said openings being smaller than the inside diameter of said wall, said wall being relatively thick at the end thereof adjacent one opening and relatively thin at its opposite end and being of tapering thickness intermediate said ends, the opening in the thin end of said wall being of greater diameter than the opening at the other end of said wall so as to spacedly surround the stud projected through said openings and engaged by the material of the dust guard defining the opening at the thick end of said wall.

3. A dust guard adapted for use with a universal joint of the type having a housing and a stud projecting from said housing, said dust guard comprising a unitarily formed piece of material of generally hollow spheroidal shape having a wall portion of outwardly convex and inwardly concave shape, said wall being of substantially lesser thickness at one end thereof than at its other end and said wall having an opening at its thin end and a radially inwardly extending annular flange at its thick end defining an opening disposed in alignment with the opening at the thin end of said wall for the reception of a stud extending through said openings, the opening in the thin end of said wall being of greater diameter than the opening defined by said flange so as to spacedly surround a stud projecting through said openings and engaged by said flange, both of said openings being smaller than the maximum inside diameter of said wall.

References Cited by the Examiner

UNITED STATES PATENTS

| 1,117,961 | 11/14 | Phillips | 277—205 X |
| 2,397,464 | 4/46 | Booth. | |
| 2,467,370 | 4/49 | Christensen | 74—18.1 X |
| 2,819,918 | 1/58 | Seaquist. | |
| 3,004,786 | 10/61 | Herbenar. | |

FOREIGN PATENTS

| 844,234 | 7/52 | Germany. |
| 852,139 | 10/60 | Great Britain. |

CARL W. TOMLIN, *Primary Examiner.*